United States Patent [19]
Jeong et al.

[11] Patent Number: 6,129,865
[45] Date of Patent: Oct. 10, 2000

[54] MANUFACTURING METHOD OF MULTIFIBER CONNECTOR FERRULE FOR RIBBON-TYPE OPTICAL CABLE

[75] Inventors: Myung Yung Jeong; Oh Gone Chun; Seung Ho Ahn; Tae Goo Choy, all of Daejeon; Hong Joon Chun, Kyunggido Kunpo, all of Rep. of Korea

[73] Assignees: Electronics and Telecommunications Research Institute, Daejeon; Korea Telecom, Seoul, both of Rep. of Korea

[21] Appl. No.: 09/127,560

[22] Filed: Jul. 31, 1998

[30] Foreign Application Priority Data

Nov. 20, 1997 [KR] Rep. of Korea ................. 97-61594

[51] Int. Cl.[7] ................................................ B29D 11/00
[52] U.S. Cl. ................... 264/1.25; 264/2.5; 264/328.11; 425/577; 425/468
[58] Field of Search ................. 264/1.24, 1.25, 264/328.1, 1.1, 2.5, 328.11; 425/577, 808, 468

[56] References Cited

U.S. PATENT DOCUMENTS

| | | | |
|---|---|---|---|
| 5,441,397 | 8/1995 | Eriksen et al. | 264/1.25 |
| 5,603,870 | 2/1997 | Roll et al. | 264/1.25 |
| 5,620,634 | 4/1997 | Shahid | 264/1.25 |
| 5,707,565 | 1/1998 | Suzuki et al. | 264/1.25 |
| 5,780,079 | 7/1998 | Lee | 264/1.25 |

OTHER PUBLICATIONS

"MT Multifiber Connectors and New Applications," Toshiaki Satake, Toru Arikawa, P. William Blubaugh, Craig Parsons*, and Toshi K. Uchida, IEEE 1994, pp. 994–999.

"Multifiber Optical Components for Subscriber Networks," Hiroshi Yokosuka, Hariharan Naidu, Hideyuki Hosoya and Yoshi Kikuchi, Electronic Components and Technology Conference 1996, pp. 487–493.

*Primary Examiner*—Mathieu D. Vargot
*Attorney, Agent, or Firm*—Cohen, Pontani, Lieberman & Pavane

[57] ABSTRACT

A method of ferrules used in an optical connector for connection and short-circuit of making multichannel optical signals. Heretofore, many fiber receiving holes have been arranged along a line at regular intervals with tolerance amounting to less than 1 micron. 10 and connect two ferrules, a precisely processed cylindrical metal guide pin under 1 micron, precise pitches formed in ferrules and a metal pin guide hole are used, Consequently, it has been necessary to maintain a high degree of precision. The present invention maintains a high degree of precision by reverse direction connection dependent merely on a predetermined height a reference plane. The reference plane is formed by relatively easy plane processing as the method of maintaining precise height and directivity of flow is added to the inside of a mold.

7 Claims, 4 Drawing Sheets

MANUFACTURING METHOD OF MULTIFIBER CONNECTOR FERRULE FOR RIBBON-TYPE OPTICAL CABLE

BACKGROUND OF THE INVENTION

1. Field of the Invention

The present invention relates to a manufacturing method of ferrules used in an optical connector for connection and short-circuit of multichannel optical signals in optical transmission. More particularly, the present invention relates to a method of maintaining the structure of a mold for transfer molding and the degree of precision which makes it possible to manufacture a high molecular ferrule, a component part of the optical connector, having a tolerance of less than 1 micron so that it sustain a contact loss of less than 1 dB. Such low contact loss is most important performances measures for optical connectors in connection with the development of a multicore optical connectors where connection and short-circuit of multichannel optical signals are required.

2. Description of the Prior Art

There exists short-circuit in optical cable due to a technical difficulty in manufacture and for proper network construction. Such short-circuit must be connected for the maintenance of optical path. Optical fiber connection must be effected very precisely so as to minimize loss. For such connection, an optical connector which is used where permanent connection by a connector and repeated attachment/detachment are required is now used. A multicore optical connector is less desirable in terms of loss characteristic when compared to a multicore mechanical splice, but more favorable with respect to adaptability and optical cable connection time. It also is preferred for prompt connection of multicore optical cables.

Multicore optical connectors developed thus far make use of basic alignment techniques such as: (1) the method of stacking a single core, (2) the method of connection by forming V-grooves in silicon substrate and the (3) method of inserting an optical fiber into a very small hole molded very precisely. The first method was developed in Japan and MU (Miniature Unit)-type back panel connector made by reducing big monocore ceramic ferrule to a half is typical. This connector does not use an optical fiber array and so it is easy to maintain and repair each line. However, this connector requires precise production technology due to low packaging density and alignment technique using small ferrules and sleeves. Consequently, it gives rise to a relatively great technical difficulty and the price is high.

The second method was developed in the United States. It is widely known as MAC (Multifiber Array Connector).

Though this method is favorable because packaging density is high with a silicon substrate etched so as to form V-grooves and especially multicore can be made possible by stacking, still it requires relatively high production technique necessary to process pitch and height so as to have the degree of precision less than 1 µm, and therefore a bottleneck is caused to price reduction, an important requisite for the connector.

The last method was developed in Japan and MT (Mechanically Transferable) type is typical. According to its use, MTP (or MPO) type is also developed. This connector is most widely used in the world. It incurs a low insertion loss. In the multicore connector realized by this method, ferrule manufacture for alignment is most essential technique and low-pressure transfer molding is used. Since the ferrule uses high molecular molding technique, it is profitable in the aspect of productivity. However, the low loss depends on the accuracy of optical fiber/guide pin guide hole (125 microns/700 microns), pitch (250 microns) and metal guide pin by two kinds of V-grooves, and so accuracy of mold must be less than 0.4 micron and that of metal guide pin less than 1 micron to maintain 1 dB of loss. It is so difficult to realize such an accuracy generally that the mold cost is high and productivity is low accordingly.

Moreover, in the multicore optical connector heretofore in use, a large number of fine holes which have a diameter of 125 microns and tolerance of less than 1 micron are arranged along a line at regular intervals (pitches) with tolerance of less than 1 micron in a high molecular material for the use of optical fiber and, to align two ferrules facing each other for connection, a cylindrical metal stick (i.e., guide pin) precisely fabricated so as to have a tolerance of not exceeding 1 micron, precise pitches formed in ferrules and a metal pin guide hole are used. Consequently, it is necessary to maintain a very high degree of accuracy. However maintaining such a high degree of accuracy increases production cost and lowers productivity. Thus, it is an important cost factor in building a superspeed information communication network now being installed throughout the world.

SUMMARY OF THE INVENTION

Molding of high molecular resin under 1 micron positively required by reason that a low contact loss and molding of many fine holes which are the essential functions of the connector are necessary is technique which it is difficult to realize from a worldwide point of view. As a means to overcome it, the present invention realizes maintenance of accuracy by reverse direction connection dependent simply on height in a reference plane. At the same time, the present invention provides a manufacturing method of optical connector ferrule for ribbon-type optical cable connection which overcomes a conventional technical difficulty by forming the reference plane according to relatively simple plane processing and adding flow directivity to the inside of the mold so as to make it possible to form fine holes in the reference plane as the method of controlling the accuracy of height.

In manufacturing a high molecular ferrule for a multicore optical connector used for connecting ribbon-type optical cables and multichannel optical path (system) and for forming a connection between apparatuses, the present invention contrived to accomplish said object is characterized by that when fine holes into which optical fibers are to be inserted precisely at regular intervals are arranged within the ferrule, their heights are made to be aligned according to external load with the lower reference plane of the ferrule as the center and, in the case of ferrules molded in the same mold, the ferrules are manufactured by an up and down symmetry-type mold so that relative connection of two ferrules may be situated along a central longitudinal plane of ferrules by selecting the reference plane of another ferrule as the reverse-direction plane.

An embodiment of the present invention includes a method of making ferrules for multicore ribbon-type optical cable connectors. Each of the ferrules has a substantially flat bottom surface defining a reference plane and a substantially flat top surface defining a reverse-direction plane. The ferrules are connectable with one another when the reference plane of one of the ferrules is substantially aligned with the reverse-direction plane of another one of the ferrules. The method comprises the steps of:

(a) providing a mold having an upper half-portion and a lower half-portion, said upper and lower half-portions being configured to define a cavity having an external shape of a ferrule;

(b) aligning and spacing a plurality of core pins in a transverse direction of said mold at a preselected pitch for forming the plurality of fiber-receiving holes of the ferrule, said plurality of core pins being positioned at a height substantially equidistant from an inside surface of said lower half-portion for forming the substantially flat bottom surface of the ferrule and an inside surface of said lower half-portion for forming the substantially flat top surface of the ferrule;

(c) filling the cavity with a molding material;

(d) curing the molding material to form the ferrule; and (e) removing the ferrule from said mold and withdrawing said core pins from the plurality of fiber-receiving holes formed in the ferrule.

DESCRIPTION OF THE PREFERRED EMBODIMENTS

The present invention relates to a method of manufacturing a ferrule, an essential component part, for the realization of an optical connector which incurs a low contact loss.

The present invention will now be described in detail according to the drawings attached hereto.

Figure 1A:
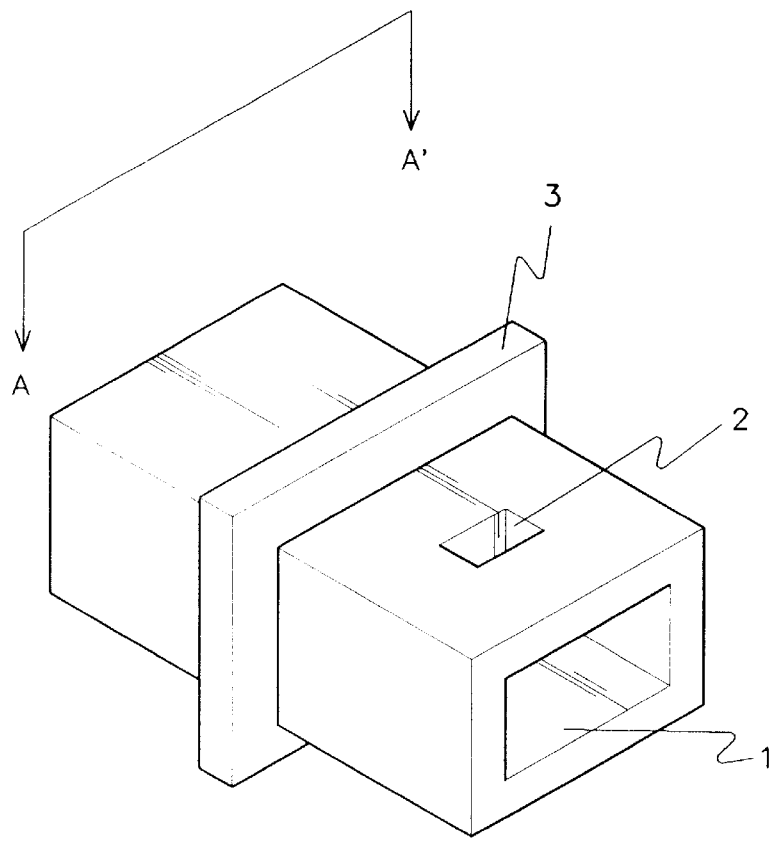
FIG. 1a shows a ferrule manufactured according to the present invention.
Figure 1B:
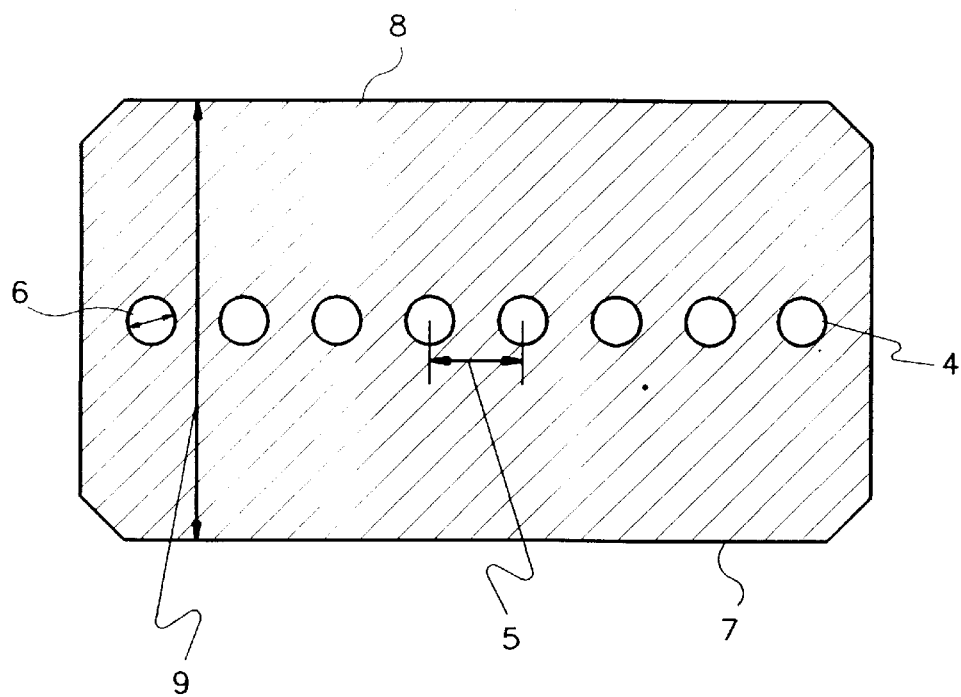
FIG. 1b shows a cross-sectional view taken along line A—A of a ferrule manufactured according to the present invention.

FIGS. 1a and 1b show a ferrule, a component essential to the optical connector, for connection with optical cables. FIG. 1a is a perspective view of a ferrule according to the present invention. FIG. 1b is a sectional view taken along line A–A' of the ferrule in which optical fibers are to be arranged.

The ferrule comprises a ribbon-type optical cable guiding part (1), an adhesive injection part (2), a flange (3) where a spring for generation of binding power is to be fixed and fine holes (4) into which precisely arranged optical fibers are to be inserted. An optical signal transmitted to the core of an optical fiber inserted fixedly into the ferrule having many fine holes with pitches (5) and diameters (6) formed precisely under 1 micron is transmitted at a very low loss from one side to the other side. Such a low loss is controlled by alignment according to load with the reference plane (7) of the ferrule as the center. In the case of ferrules formed in the same mold, if relative connection of two ferrules are precisely situated in the middle (one half) of outer height (9) of ferrules by selecting the reference plane of another ferrule as a reverse direction plane, different accuracy is nearly eliminated, and so the optical signal can be transmitted at a low loss.

Figure 2:
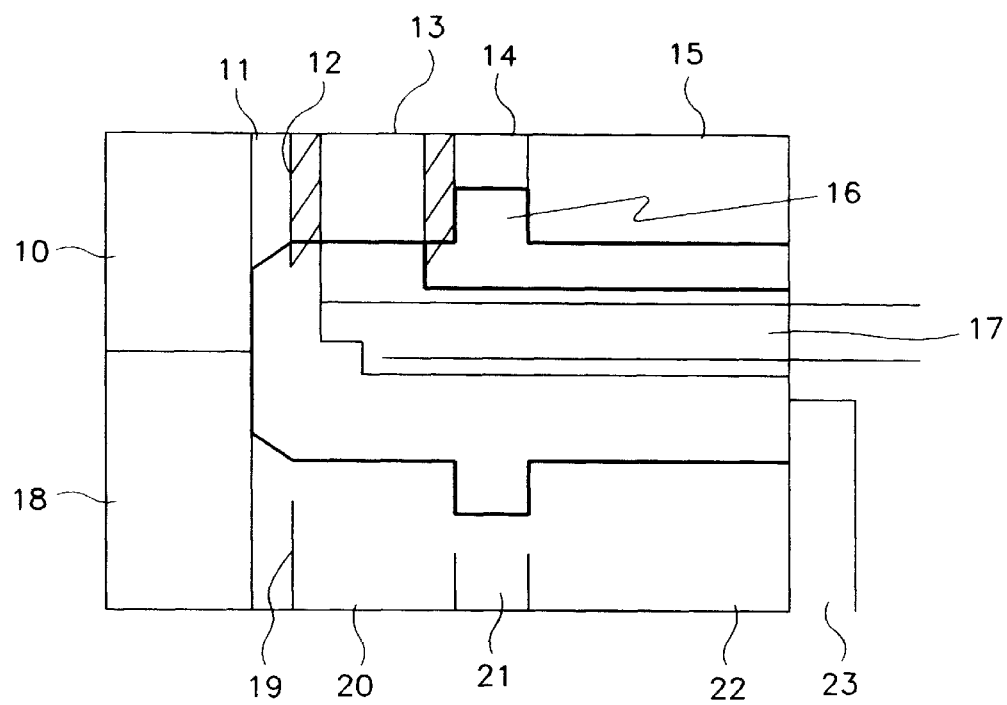
FIG. 2 is a structural view of a ferrule mold describing the present invention.

FIG. 2 is a structural view of a ferrule mold describing the present invention.

During molding, resin is made to flow inside a mold by applying pressure to the material at a high temperature with a transfer molding device. The mold is divided into an upper and a lower portion so that a parting line may not affect the alignment of ferrules. To keep a fine core pin used for molding of holes from becoming bent, gate is situated so as to produce symmetric pressure.

As illustrated, the upper clamping core (10) and the lower clamping core (18) are formed. The upper chamfer core (11) and the lower chamfer core (19) are installed by connecting them to said clamping cores (10, 18). The upper frontal body core (12) is installed by connecting it to said upper chamfer core (11). An injection mouth core (13) to inject high molecular resin is installed in succession. The upper flange core (14) to mold the flange (3) part is installed successively. Facing the injection mouth core (13) and the upper flange core (14), the lower frontal body core (20) and the lower flange core (21) are installed successively to said lower chamfer core (19). The upper rear core (15) and the lower rear core (22) are installed successively to said upper and lower flange cores (14, 21). A cut-off cover is installed in succession.

As to a molding process, about 30 minutes are maintained so that high molecular resin may be hardened within the mold and core pins are removed by the operation of slide cores (16, 17) after molding and a ferrule is manufactured. In order to secure the accuracy of the ferrule, the mold is simply structured by reducing the number of components so that precise processing may be easy. To improve assemblage, tolerance is allowed within the limits of not affecting the accuracy of the ferrule.

Figure 3:
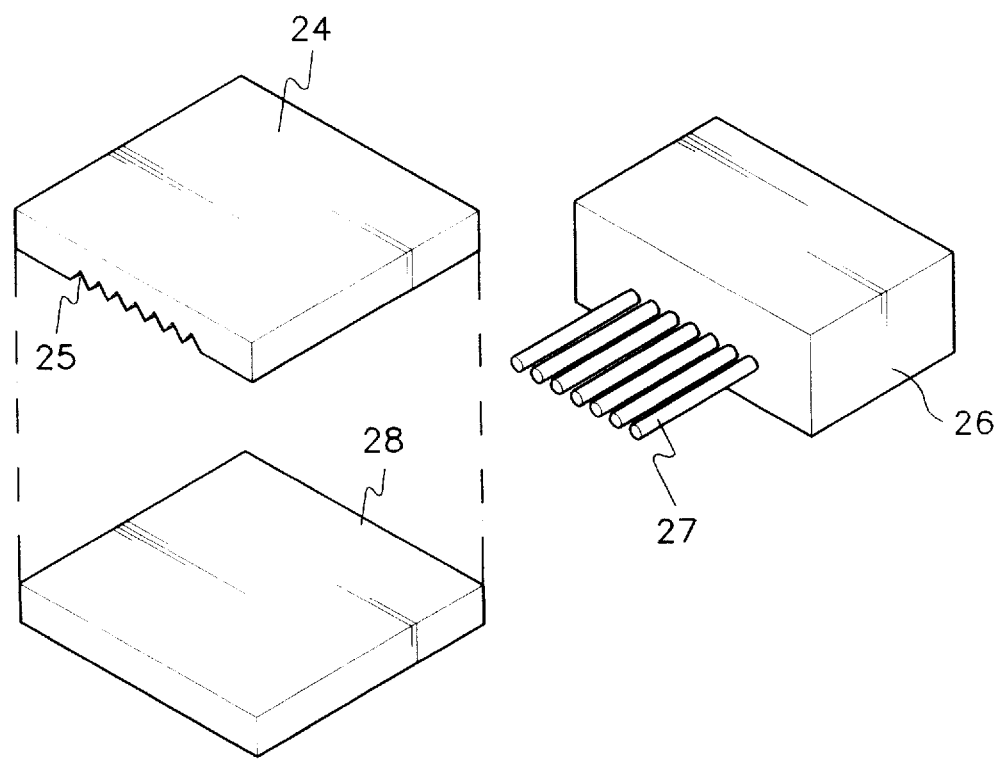
FIG. 3 is a conceptual view of parts of the mold having V-grooves so as to realize a high degree of precision which is the major function of the ferrule.

FIG. 3 is a schematic view of parts of a mold having V-grooves so as to obtain a high degree of precision which is the major function of the ferrule. In the upper type (24), V-grooves (25) are formed at a pitch of 250 microns. The pitch is maintained by situating a core pin (27) installed within a core pin fixing block (26) in the V-groove (25). The height of ferrules can be made uniform if the lower portion (28), which is a reference plane for installation of core pins, is maintained at an accuracy under micron by plane processing. The core pins received within the V-grooves in the mold have a gap of about several microns. If a deflection is produced in the uniformity of height by such a gap, the core pin constitutes a nonalignment factor two times as great as deflection of reference line and raises a loss when united in an opposite direction, and so a gate is situated in order that flowing force within the mold may vertically act on the lower type. This method is realized if high molecular material flowing in through the gate is turned upward.

Figure 4A:
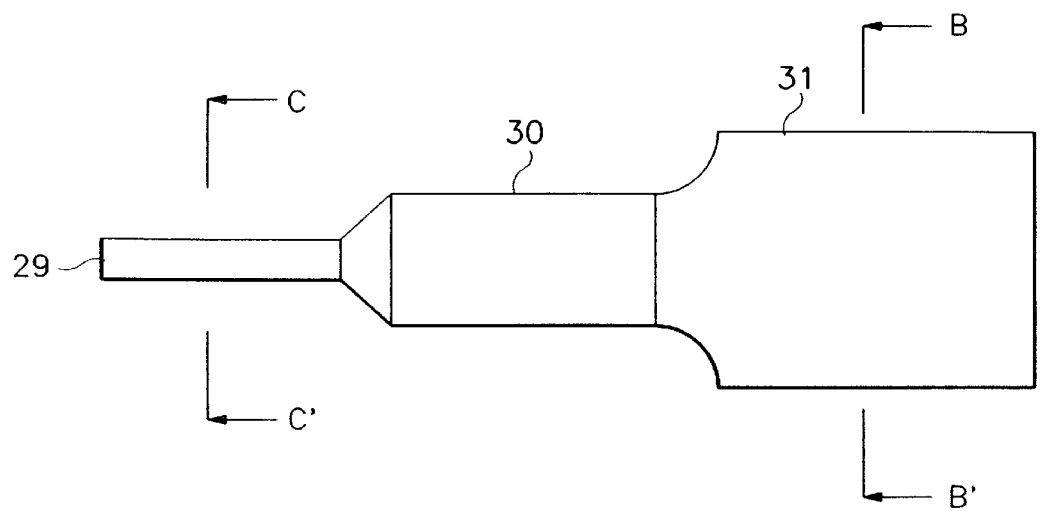
FIG. 4a shows a whole shape of a mold corex.
Figure 4B:
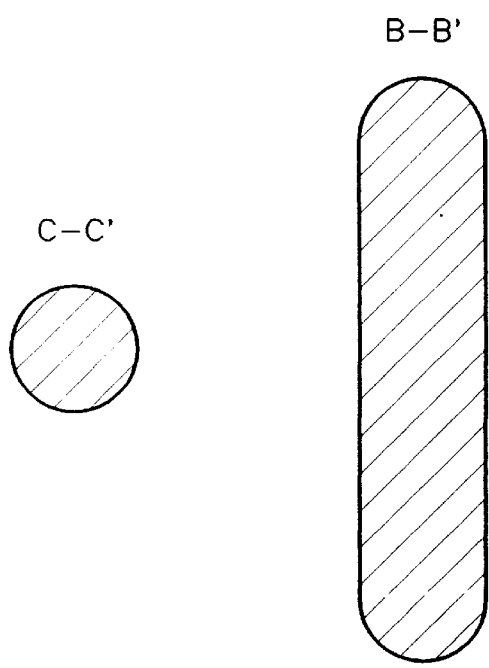
FIG. 4b shows a cross-sectional view taken along line C–C' of a mold core.

FIGS. 4a and 4b show the shape of a mold core. FIG. 4a is a whole shape and FIG. 4b are sectional views taken along B–B' line and C–C' line. For the core pin, its diameter, the length of molding part, a method of fixing it to the mold and the curved surface of guiding groove are important. It is transformed into three steps.

The measurements of three-step core pin are as follows:

Hole molding portion (29): ∅126+1 μm

Guiding groove molding portion (30): ∅2501 μm

Mold fixing portion (31): ∅750 μm

The core pin is preferably made of tungsten carbide the size of its grains is less than 0.5 μm. It is fabricated by means of a grinder. As to pitch accuracy maintenance technique, pitch is made so as to secure its accuracy by forming the structure of mold and core pin independently. In other words, V-grooves in which core pins are to be installed are processed by precise grinding in the mold and the guiding groove molding part of core pin itself is manufactured to 250±1 µm. Thus, a rough pitch can be maintained by installing the core pin in the mold as a first step and a precise pitch is maintainable by installing it in the V-groove as a second step.

The present invention provided a has realized the ferrule, a component essential to a multicore optical connector to be used in large numbers an optical communication system and line, by means of a new structure and a new manufacturing method. It has adopted reverse-direction reference plane connection structure by forming an up and down symmetry type connection plane in order to reduce dependence on ultraprecise molding technique, which is a difficulty suffered by high molecular material. When the ferrule is molded, the lower type plane is changed to a plane type which can be relatively easily processed for the precise arrangement of fine holes, so that production can be stabilized and the ferrule can be manufactured on a commercial basis. Consequently, it is also possible to lower the price of a multicore optical connector.

What is claimed is:

1. A method of making ferrules for multicore ribbon optical cable connectors, each of the ferrules having a substantially flat bottom surface defining a reference plane and a substantially flat top surface defining a reverse-direction plane, the ferrules being connectable with one another when the reference plane of one of the ferrules is substantially aligned with the reverse-direction plane of another one of the ferrules, the method comprising the steps of:

(a) providing a mold having an upper half-portion and lower half-portion, said upper and lower half-portions being configured to define a cavity having an external shape of ferrule;

(b) aligning and spacing a plurality of core pins in a transverse direction of said mold at a preselected pitch for forming the plurality of fiber-receiving holes of the ferrule, said plurality of core pins being positioned at a height substantially equidistant from an inside surface of said lower half-portion for forming the substantially flat bottom surface of the ferrule and an inside surface of said upper half-portion for forming the substantially flat top surface of the ferrule;

(c) filling the cavity with a molding material;

(d) curing the molding material to form the ferrule; and (e) removing the ferrule from said mold and withdrawing said core pins from the plurality of fiber-receiving holes formed in the ferrule.

2. The method of claim 1, further comprising the step of adding a gate to the mold for directing a flow of the molding material in a direction substantially perpendicular to the inside surface of said lower half-portion.

3. The method of claim 1, further comprising the step of providing a plurality of V-grooves in at least one of the upper and lower portions of the mold for positioning said core pins.

4. The method of claim 1, wherein three-step core pins are used during said step (b).

5. The method of claim 4, wherein said three-step core pins are used to maintain a rough pitch, and further comprising the step of positioning said three-step core pins in their respective V-grooves for maintaining a precise pitch therebetween.

6. The method of claim 1, further comprising the step of plane processing said inside surface of said lower half-portion.

7. The method of claim 1, further comprising the step of plane processing said inside surface of said upper half-portion.

* * * * *